(12) United States Patent
Yeckley et al.

(10) Patent No.: US 9,620,939 B2
(45) Date of Patent: Apr. 11, 2017

(54) HYBRID CIRCUIT BREAKERS

(71) Applicant: MITSUBISHI ELECTRIC POWER PRODUCTS, INC., Warrendale, PA (US)

(72) Inventors: Russell N. Yeckley, Murrysville, PA (US); Dennis J. Matuszak, Seven Fields, PA (US)

(73) Assignee: MITSUBISHI ELECTRIC POWER PRODUCTS, INC., Warrendale, PA (US)

( * ) Notice: Subject to any disclaimer, the term of this patent is extended or adjusted under 35 U.S.C. 154(b) by 0 days.

(21) Appl. No.: 14/740,118

(22) Filed: Jun. 15, 2015

(65) Prior Publication Data
US 2016/0365709 A1 Dec. 15, 2016

(51) Int. Cl.
| H02B 13/00 | (2006.01) |
| H02B 13/035 | (2006.01) |
| H02B 1/01 | (2006.01) |
| H02B 1/26 | (2006.01) |
| H02B 5/06 | (2006.01) |

(52) U.S. Cl.
CPC ............. H02B 13/00 (2013.01); H02B 1/01 (2013.01); H02B 1/26 (2013.01); H02B 13/035 (2013.01); H02B 5/06 (2013.01)

(58) Field of Classification Search
CPC ........ H02B 5/00; H02B 13/0655; H02B 3/00; H02B 5/06; H01H 3/46; H01H 33/26; H01H 31/02; H01H 9/02; H01H 9/00; H01H 31/00; H01B 17/16

USPC ........ 361/601–605, 611–612, 618–627, 637, 361/641; 218/43–88, 13, 7, 3, 20, 143; 174/161 R, 163 R, 112, 71 B, 520, 31 R, 174/142; 335/2, 8, 15, 20, 202; 200/48 R, 200/48 P
See application file for complete search history.

(56) References Cited

U.S. PATENT DOCUMENTS

| 3,891,862 | A | * | 6/1975 | Clark | H01H 33/02 307/125 |
| 4,016,382 | A | * | 4/1977 | Roth | H02B 13/035 174/161 R |
| 5,128,502 | A | * | 7/1992 | Hux | H01H 33/008 218/153 |
| 5,478,980 | A | | 12/1995 | Freeman et al. | |
| 5,569,891 | A | * | 10/1996 | Freeman | H02B 13/0352 200/17 R |
| 5,576,523 | A | * | 11/1996 | Meyer | H02B 13/0352 200/17 R |
| 6,127,641 | A | * | 10/2000 | Meinherz | H02B 13/0352 174/18 |
| 6,410,867 | B1 | * | 6/2002 | Meyer | H02B 13/045 200/49 |

(Continued)

Primary Examiner — Zachary M Pape
(74) Attorney, Agent, or Firm — One LLP (57) ABSTRACT

Hybrid gas circuit breakers comprising a main breaker tank having an interrupter assembly positioned therein, bushing support nozzles laterally extending from the breaker tank, disconnect switches coupled to and extending generally upwardly or vertically from the bushing support nozzles, and bushings assembled to the disconnect switches. In addition, bushing current transformers (BCTs) are assembled on the bushing support nozzles adjacent the breaker tank instead. The lateral positioning of components results in a low assembled height permitting shipping of a fully assembled and tested unit for voltage ratings up to and including 362 kV.

14 Claims, 5 Drawing Sheets

(56) References Cited

U.S. PATENT DOCUMENTS

| | | | | |
|---|---|---|---|---|
| 6,538,224 B2* | 3/2003 | Furuta | | H02B 13/035 |
| | | | | 218/154 |
| 7,915,558 B2* | 3/2011 | Nelson | | H02B 5/00 |
| | | | | 218/155 |
| 8,080,746 B2 | 12/2011 | Bruckert et al. | | |
| 8,338,727 B2* | 12/2012 | Wolfe | | H01H 33/022 |
| | | | | 200/17 R |
| 8,440,913 B2* | 5/2013 | Stull | | H02B 5/00 |
| | | | | 174/161 R |
| 8,963,027 B2* | 2/2015 | Cuppett | | H01H 33/02 |
| | | | | 200/48 R |
| 2007/0119818 A1* | 5/2007 | Meinherz | | H01H 31/003 |
| | | | | 218/13 |
| 2008/0257865 A1* | 10/2008 | Yoshitomo | | H02B 13/035 |
| | | | | 218/68 |
| 2009/0045892 A1* | 2/2009 | Nelson | | H02B 5/00 |
| | | | | 335/202 |
| 2010/0270056 A1* | 10/2010 | Stull | | H02B 5/00 |
| | | | | 174/161 R |
| 2011/0180514 A1 | 7/2011 | Jin | | |
| 2013/0270086 A1* | 10/2013 | Dahm | | H01H 31/026 |
| | | | | 200/48 A |
| 2015/0249323 A1* | 9/2015 | Errico | | H02B 5/00 |
| | | | | 361/605 |

* cited by examiner

HYBRID CIRCUIT BREAKERS

FIELD

The embodiments described herein relate generally to hybrid gas circuit breakers and, more particularly, to systems and methods that facilitate shipping assembled, and production tested hybrid circuit breakers, and field assembly thereof.

BACKGROUND INFORMATION

Hybrid gas circuit breakers generally refer to circuit breakers assembled with disconnect switches, ground switches and bushings as a complete assembly. Conventional air substations have disconnect switches as a separate assembly from a circuit breaker and grounding is accomplished manually. In contrast, a hybrid circuit breaker is a complete assembly consisting of a gas insulated circuit breaker with disconnect switches, ground switches, and bushings in gas insulated equipment. Compared to a conventional air insulated assembly, the hybrid circuit breaker greatly reduces the space requirement for such assemblies. The reduced size can also be beneficial when space is not available for an air substation, but cost and/or other factors preclude utilization of a gas-insulated switchgear system.

A conventional hybrid circuit breaker is generally configured as a standard circuit breaker with the disconnect switches mounted on a breaker in place of the bushings, with the bushings and current transformers assembled above the disconnect switches. This results in an assembly with excessive height typically requiring shipping as separate components and assembly in the field, and with a final assembly that has mechanical devices at inaccessible heights. Assembly of components in the field requires complete testing of the final assembly including high voltage tests, leak tests, and mechanical tests.

Thus, it is desirable to provide improved systems and methods that facilitate shipping and final assembly of hybrid circuit breakers.

SUMMARY

The embodiments provided herein are directed to hybrid gas circuit breakers and include systems and methods that facilitate shipping a functionally complete hybrid (except for the structural mounting frame), and eliminate subsequent field assembly and testing of hybrid gas circuit breaker components contained therein. In embodiments provided herein, a hybrid circuit breaker includes a main breaker tank with a mechanical interrupter positioned therein, and first and second bushing support nozzles protruding laterally or horizontally from the breaker tank, all of which are adopted without modification from a standard circuit breaker. The hybrid circuit breaker further includes first and second disconnect switches coupled to and extending generally vertically or upwardly from the first and second bushing support nozzles, with intake and exit bushings assembled to the first and second disconnect switches. First and second bushing current transformers (BCTs) are advantageously assembled on the first and second bushing support nozzles that protrude from the main breaker tank. The horizontal orientation of the nozzles locates the switches nearer to the ground, enabling easier access to switch viewports and mechanical linkages. The main tank, together with the first and second bushing support nozzles, first and second BCTs, first and second disconnect switches and first and second bushings, all attached thereon, are mounted on and contained within a single support frame. A control unit, mounted to the support frame, provides operational control of the hybrid circuit breaker.

The assembling of the bushing current transformers (BCTs) on the bushing support nozzles that protrude from the breaker tank instead of on the bushing mounts as in conventional hybrid circuit breakers, is also adopted from a standard circuit breaker. This advantageously results in the weight of the BCTs, which is substantial, being borne by the tank body, which is inherently structurally superior to mountings on the bushings. In addition, mounting the BCTs integral to the tank body places them closer to the ground for improved maintainability, and having their substantial weight lower to the foundation improves seismic resistance for the entire hybrid breaker unit.

In other embodiments, a 3-pole hybrid circuit breaker assembly includes first, second and third hybrid circuit breaker poles on a unitized support frame. The 3-pole hybrid circuit breaker assembly is a gang operated breaker with a single mechanism to operate all three poles, but an alternative assembly may utilize a separate mechanism on each pole to allow the poles to be operated independently.

With the exception of a lower structural mounting frame which elevates the breaker to a prescribed installed height, the example embodiments of hybrid gas circuit breakers and circuit breaker assemblies provided herein are capable of being shipped in a completely assembled and tested configuration and pressurized with a nominal charge of gas, which saves substantial time, labor, testing, and risk of damage during and/or due to installation. In contrast, conventional hybrid gas circuit breakers and assemblies require substantial assembly, alignment, adjustment, and/or testing of tanks, operating linkages, bushings and/or other major components during field installation.

Other systems, methods, features and advantages of the example embodiments will be or will become apparent to one with skill in the art upon examination of the following figures and detailed description.

BRIEF DESCRIPTION OF THE FIGURES

The details of the example embodiments, including fabrication, structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

The embodiments described herein are directed to hybrid gas circuit breakers and include systems and methods that facilitate the shipping and field assembly of hybrid gas circuit breakers. Example embodiments of hybrid circuit breakers provided herein include a main breaker tank or vessel having an interrupter assembly positioned therein and bushing support nozzles extending from the breaker tank, with disconnect switches coupled to the bushing support nozzles and bushings assembled to the disconnect switches. In contrast to conventional hybrid circuit breakers, the bushing support nozzles extend laterally or horizontally from the breaker tank and the disconnect switches extend in a generally upward or vertical direction therefrom. In addition, the embodiments of the hybrid gas circuit breakers include bushing current transformers (BCTs) assembled on the bushing support nozzles that protrude from the breaker tank, instead of on the bushing mounts as in conventional hybrid circuit breakers. As a result, the weight of the BCTs, which is substantial, is borne by the tank body, which is inherently structurally superior to typical bushing mountings. Mounting the BCTs integral to the tank body places the BCTs closer to the ground for improved maintainability and improved seismic resistance of the entire hybrid breaker unit. Moreover, the configuration of the example embodiments provide an assembly that can be completely production tested and shipped fully assembled with the exception of support legs needed for a final field assembly.

In a preferred embodiment, a hybrid gas circuit breaker comprises a standard tank from a conventional gas circuit breaker, reoriented with the bushing support nozzles rotated from a vertical orientation to a horizontal orientation, a standard mechanical interrupter positioned in a conventional orientation within the rotated tank, first and second bushing support nozzles that protrude laterally or horizontally from the tank, first and second disconnect switches assembled to and extending upwardly from the first and second bushing support nozzles, intake and exit bushings assembled to the first and second disconnect switches, and first and second bushing current transformers (BCTs) assembled on the first and second bushing support nozzles adjacent the tank. The lateral positioning of components results in a low assembled height permitting shipping of a fully assembled and tested unit for voltage ratings up to and including 362 kV.

Figure 1:
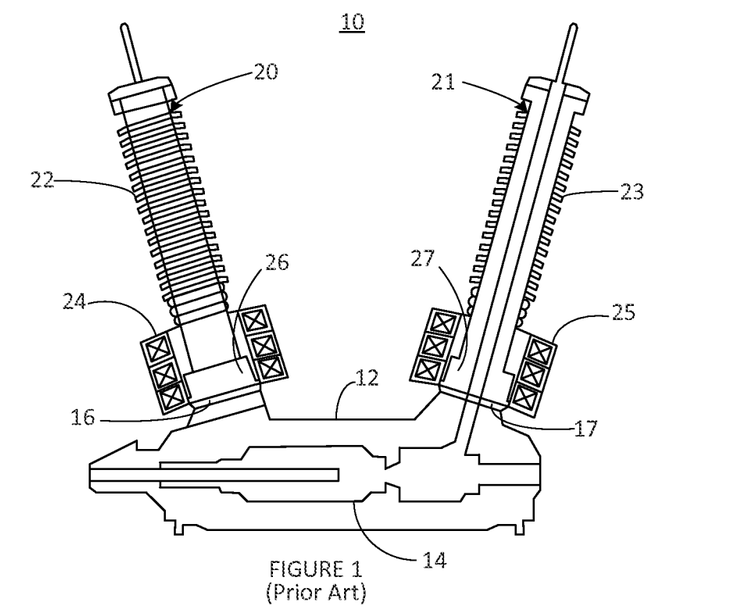
FIG. 1 is a side view of an example of a conventional gas circuit breaker.

Turning to the figures, an example of a conventional gas circuit breaker 10 is shown in FIG. 1. As depicted, the conventional circuit breaker 10 includes a main breaker tank or vessel 12 with a mechanical interrupter 14 positioned therein and bushing support nozzles 16 and 17 protruding from the breaker tank 12. Intake and exit bushings 20 and 21 are coupled to the tank 14 with bushing adapter flanges 26 and 27 coupled to the bushing support nozzles 16 and 17. The bushings 20 and 21 include insulators 22 and 23 and current transformers (BCTs) 24 and 25 positioned adjacent the bushing adapter flanges 26 and 27.

Figure 2:
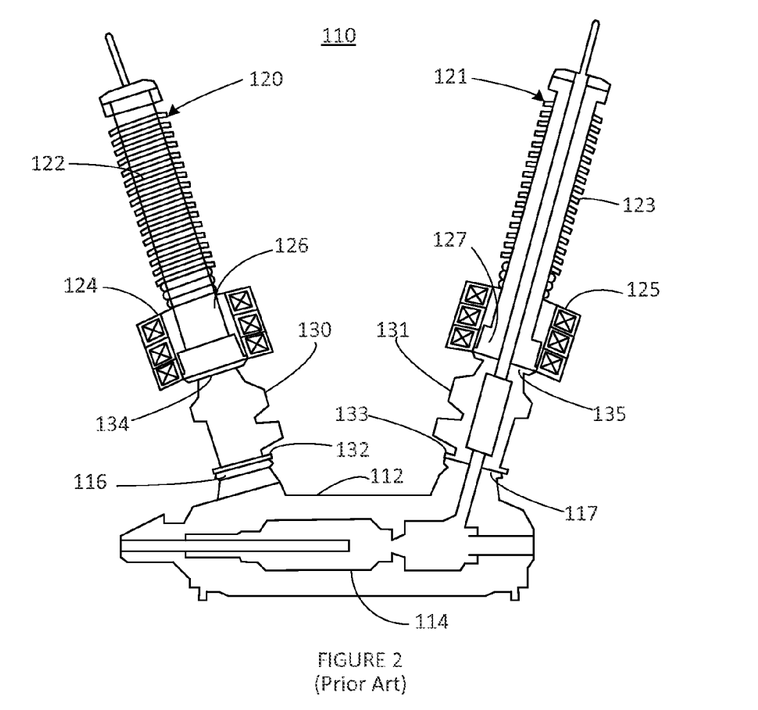
FIG. 2 is a front view of the example of the conventional hybrid circuit breaker.

Referring to FIG. 2, one pole of a conventional hybrid circuit breaker 110 similarly includes a main breaker tank 112 with a mechanical interrupter 114 positioned therein and bushing support nozzles 116 and 117 protruding from the breaker tank 112. Instead of intake and exit bushings 120 and 121 assembled on the bushing support nozzles 116 and 117, the conventional hybrid circuit breaker 110 includes disconnect switches 130 and 131 are coupled to the bushing support nozzles 116 and 117 at lower switch mounts 132 and 133. The intake and exit bushings 120 and 121 are then assembled to the disconnect switches 130 and 131 via bushing mounts 126 and 127, which are coupled to upper switch mounts 134 and 135 of the disconnect switches 130 and 131. Discreet current transformers (BCTs) 124 and 125 are typically positioned adjacent the bushing mounts 126 and 127 with insulators 122 and 123 extending upwardly therefrom.

Figure 3:
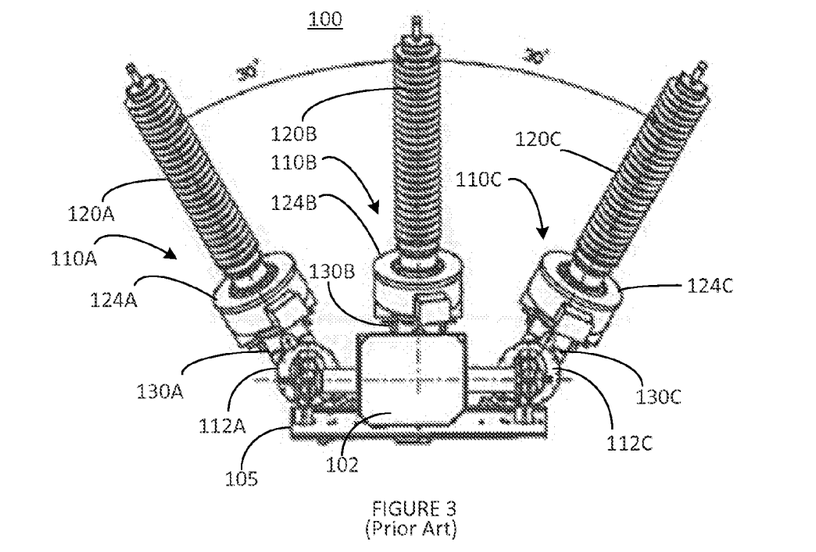
FIG. 3 is a front view of an example of a conventional 3-pole hybrid circuit breaker system.

Turning to FIG. 3, three conventional hybrid circuit breaker poles 110A, 110B and 110C are assembled to form a 3-pole circuit breaker assembly 100 mounted on a mounting frame 105. The three hybrid circuit breaker poles 110A, 110B and 110C comprise the same components described above with regard to the hybrid circuit breaker 110 shown in FIG. 2. As depicted, the circuit breaker assembly 100 is a gang operated breaker with a single mechanism 102 to operate all three poles.

These configurations of the conventional hybrid circuit breaker 110 and the 3-pole hybrid circuit breaker assembly 100 undesirably results in an assembly with an excessive height requiring shipping in separate components and assembly in the field, with mechanical devices at inaccessible heights during a field assembly and subsequent maintenance.

Figure 4:
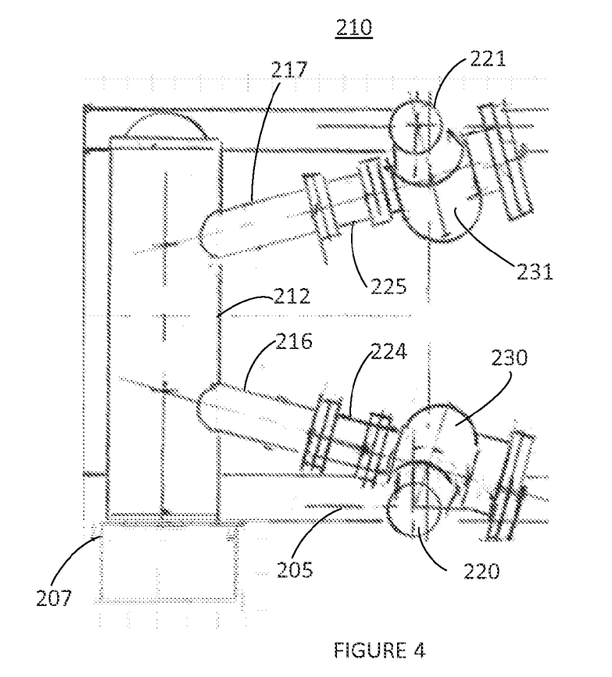
FIG. 4 is a top view of an example embodiment of a hybrid circuit breaker.
Figure 5:
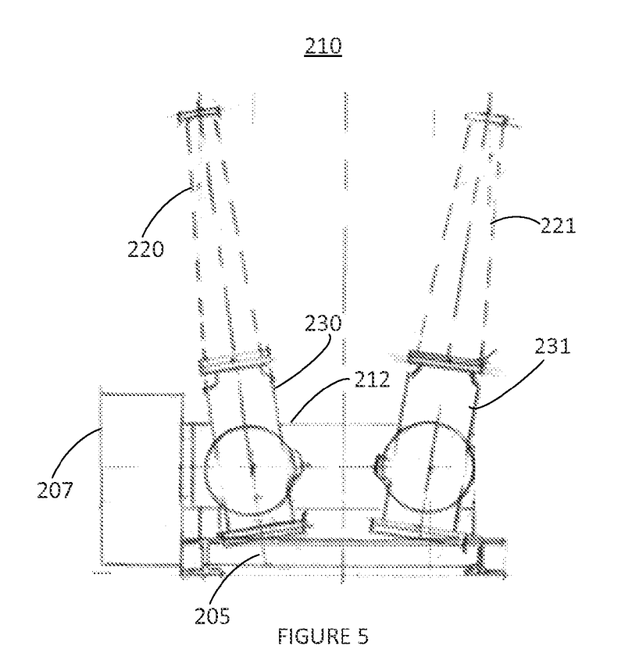
FIG. 5 is a side view of the example embodiment of the hybrid circuit breaker shown in FIG. 4.

As shown in FIGS. 4 and 5, the embodiments of a hybrid gas circuit breaker 210 include a main breaker tank 212 with a mechanical interrupter positioned therein and first and second bushing support nozzles 216 and 217 protruding laterally or horizontally from the breaker tank 212. The hybrid circuit breaker 210 further includes first and second disconnect switches 230 and 231 coupled to and extending generally vertically or upwardly from the first and second bushing support nozzles 216 and 217 with intake and exit bushings 220 and 221 assembled to the first and second disconnect switches 230 and 231. First and second bushing current transformers (BCTs) 224 and 225 are advantageously assembled on the first and second bushing support nozzles 216 and 217 adjacent the main breaker tank 212. The main tank 212, first and second bushing support nozzles 216 and 217, first and second BCTs 224 and 225, first and second disconnect switches 230 and 231 and first and second bushings 220 and 221 are mounted as a unit to a support frame 205. A control unit 207 is mounted to the support frame 205 provides operational control of the hybrid circuit breaker 210.

Figure 6:
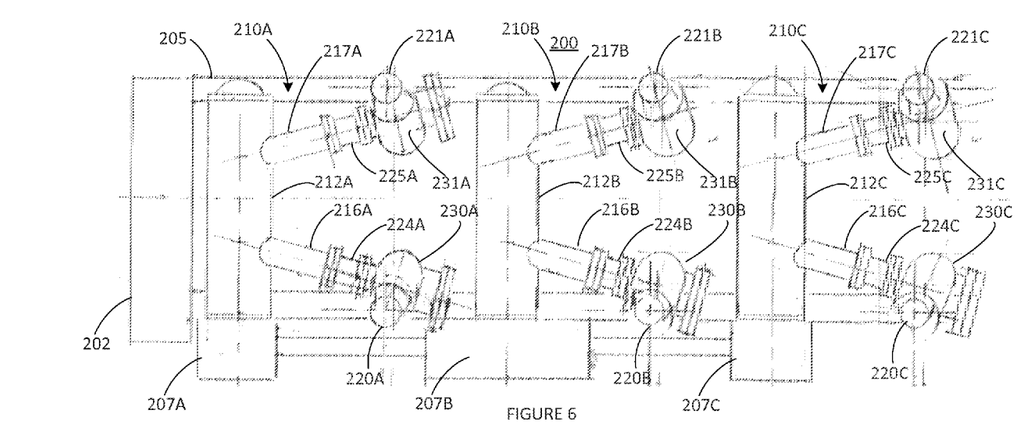
FIG. 6 is a top view of an example embodiment of a 3-pole hybrid circuit breaker assembly comprising three of the hybrid circuit breakers shown in FIG. 4.
Figure 7:
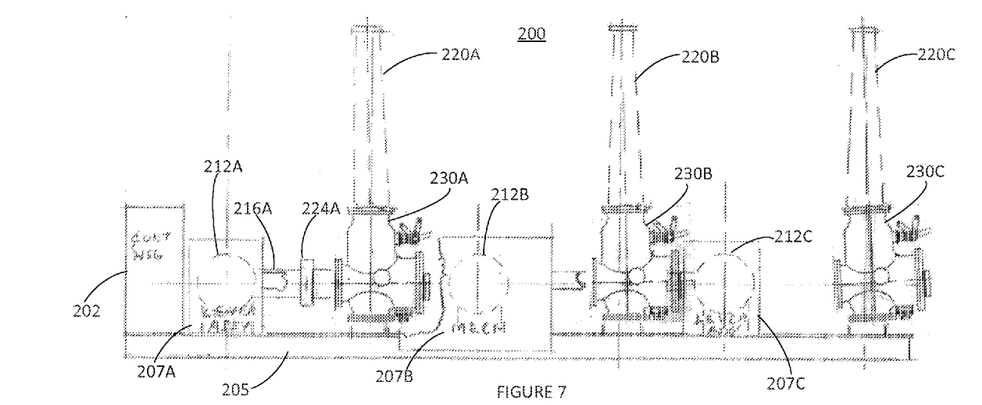
FIG. 7 is a side view of the 3-pole hybrid circuit breaker assembly shown in FIG. 6.

Turning to FIGS. 6 and 7, embodiments of a 3-pole hybrid circuit breaker assembly 200 is shown to include first, second and third hybrid circuit breaker poles 210A, 210B and 210C on a support frame 205. Each of the first, second and third hybrid circuit breakers 210A, 210B and 210C include a main breaker tank 212A, 212B and 212C with a mechanical interrupter positioned therein, first and second bushing support nozzles 216A, 217A, 216B, 217B, 216C and 217C protruding laterally or horizontally from the breaker tank 212A, 212B and 212C, first and second disconnect switches 230A, 231A, 230B, 231B, 230C and 231C coupled to and extending generally vertically or upwardly from the first and second bushing support nozzles 216A, 217A, 216B, 217B, 216C and 217C, intake and exit bushings 220A, 221A, 220B, 221B, 220C and 221C assembled to the first and second disconnect switches 230A, 231A, 230B, 231B, 230C and 231C, and first and second bushing current transformers 224A, 225A, 224B, 225B, 224C and 225C assembled on the first and second bushing support nozzles 216A, 217A, 216B, 217B, 216C and 217C adjacent the main breaker tank 212A, 212B and 212C.

The 3-pole hybrid circuit breaker assembly 200 is depicted as a gang operated breaker with a single mechanism to operate all three phases. A main control unit 202 is mounted on the support frame 205 and in communication with a breaker control unit 207B. The breaker control unit 207B houses a mechanism coupled to a lever assembly that operates the interrupter of the second circuit breaker 210B and lever assemblies 207A and 207C that operate the interrupter of the first and third circuit breakers 210A and 210C.

The option would be available to utilize separate mechanisms mounted on each of the three poles for independent-pole-operated (IPO) operation. The operation of the disconnect switches and ground switches would be simplified with basically "in line" linkage connections.

Figure 8:
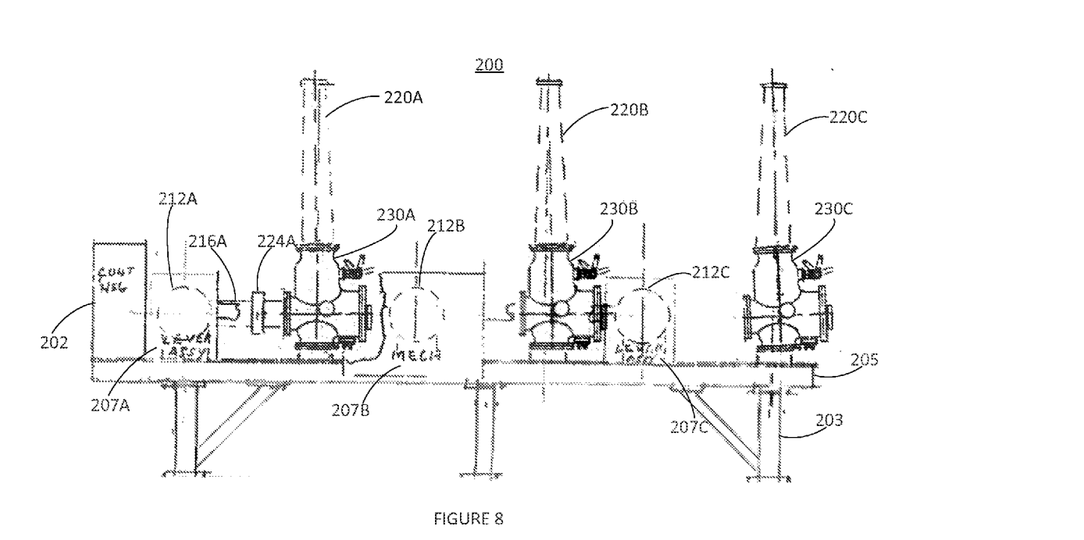
FIG. 8 is a side view of the 3-pole hybrid circuit breaker assembly shown in FIGS. 6 and 7 mounted on a support structure in a final assembly configuration.
Figure 9:
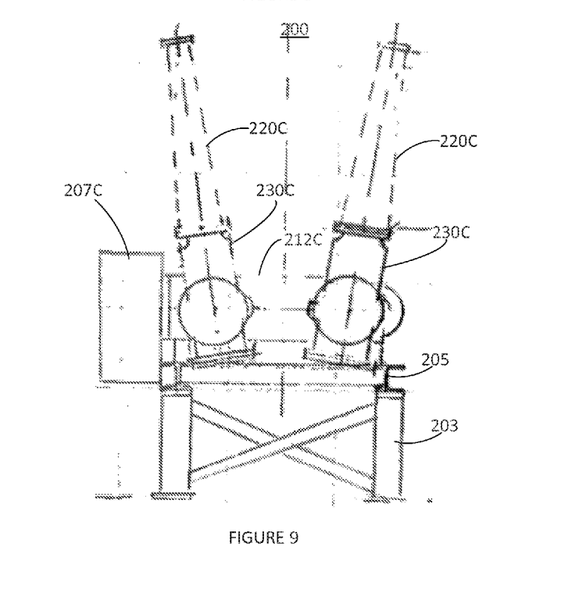
FIG. 9 is an end view of the 3-pole hybrid circuit breaker assembly shown in FIG. 8.

The convenient location of components of the embodiments of the hybrid circuit breaker 210 and 3-pole circuit breaker assembly 200 close to the ground is advantageous for maintenance, and for providing access to viewing ports that enable observation of the disconnect switch and ground switch contacts. The low profile also makes the circuit breaker 210 and assembly 200 inherently more earthquake resistant. The low profile provides convenient access to instrumentation such as the gas monitors of the breaker and disconnects gas systems Referring to FIGS. 8 and 9, the complete hybrid circuit breaker unit 200 is assembled in the field by mounting the assembly 200 on structural support legs 203 to maintain the hybrid circuit breaker assembly 200 in a prescribed spaced relation with the ground. The low profile makes it possible for voltages below 362 kV to provide a complete Substation position as a portable assembly on a truck.

In the foregoing specification, all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. Express recitation of every possible combination and substitution is overly burdensome, especially given that the permissibility of each and every such combination and substitution will be readily recognized by those of ordinary skill in the art upon reading this description.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

As used herein and in the appended claims, the singular forms "a", "an", and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A hybrid gas circuit breaker comprising:
a tank having a longitudinal axis,
a mechanical interrupter positioned within the tank,
first and second bushing support nozzles having a longitudinal axis,
first and second disconnect switches,
intake and exit bushings, and
first and second bushing current transformers (BCTs),
wherein the hybrid gas circuit breaker having a shipping state configuration and an operational state configuration, wherein the shipping state configuration includes the longitudinal axis of the tank being oriented horizontally, the first and second bushing support nozzles protruding laterally from the tank from a first end of the first and second bushing support nozzles with the longitudinal axis of the first and second bushing support nozzles being oriented horizontally, the first and second BCTs are coaxially assembled on the first and second bushing support nozzles, the first and second disconnect switches are coupled to a second end of the first and second bushing support nozzles and extending upwardly in a vertical direction from the first and second bushing support nozzles, and the intake and exit bushings are coaxially assembled to and vertically extending from the first and second disconnect switches, and
wherein the operational state configuration matches the shipping state configuration.

2. The hybrid gas circuit breaker of claim 1, wherein the mechanical interrupter is positioned in a horizontal orientation within the tank.

3. The hybrid gas circuit breaker of claim 1, wherein the tank, first and second bushing support nozzles, first and second BCTs, first and second disconnect switches and first and second bushings are mounted in the operational state configuration to a support frame.

4. The hybrid gas circuit breaker of claim 3, further comprising a control unit mounted to the support frame for operational control of the hybrid circuit breaker.

5. A 3-pole hybrid circuit breaker assembly comprising:
first, second and third hybrid circuit breaker poles,
wherein each of the first, second and third hybrid circuit breakers comprise
a main breaker tank having a longitudinal axis,
a mechanical interrupter positioned within the tank,
first and second bushing support nozzles having a longitudinal axis,
first and second disconnect switches,
intake and exit bushings, and
first and second bushing current transformers (BCTs),
wherein the hybrid gas circuit breaker having a shipping state configuration and an operational state configuration, wherein the shipping state configuration includes the longitudinal axis of the tank being oriented horizontally, the first and second bushing support nozzles protruding laterally from the tank from a first end of the first and second bushing support nozzles with the longitudinal axis of the first and second bushing support nozzles being oriented horizontally, the first and second BCTs are coaxially assembled on the first and second bushing support nozzles, the first and second disconnect switches are coupled to a second end of the first and second bushing support nozzles and extending upwardly in a vertical direction from the first and second bushing support nozzles, and the intake and exit bushings are coaxially assembled to and vertically extending from the first and second disconnect switches, and
wherein the operational state configuration matches the shipping state configuration.

6. The 3-pole hybrid circuit breaker assembly of claim 5, wherein the first, second and third hybrid circuit breaker poles are gang operated with a single mechanism to operate all three phases.

7. The 3-pole hybrid circuit breaker assembly of claim 5, further comprising a support frame, wherein the first, second and third hybrid circuit breakers are mounted in the operational state configuration on the support frame.

8. The 3-pole hybrid circuit breaker assembly of claim 7, further comprising a main control unit mounted on the support frame.

9. The 3-pole hybrid circuit breaker assembly of claim 8, further comprising a first breaker control unit in communication with the main control unit.

10. The 3-pole hybrid circuit breaker assembly of claim 9, wherein the first breaker control unit houses a mechanism coupled to a lever assembly that operates the interrupter of the first circuit breaker.

11. The 3-pole hybrid circuit breaker assembly of claim 10, wherein the first control unit houses lever assemblies that operate the interrupter of the second and third circuit breakers.

12. The 3-pole hybrid circuit breaker assembly of claim 8, further comprising first, second and third breaker control units in communication with the main control unit.

13. The 3-pole hybrid circuit breaker assembly of claim 8, further comprising structural support legs coupled to the support frame to maintain the hybrid circuit breaker assembly in spaced relation with the ground.

14. The 3-pole hybrid circuit breaker assembly of claim 12, wherein the first, second and third breaker control units utilize separate mechanisms mounted on each of the first, second and third hybrid circuit breaker poles for independent-pole-operated (IPO) operation.

* * * * *